(12) United States Patent
Vora

(10) Patent No.: US 6,463,162 B1
(45) Date of Patent: Oct. 8, 2002

(54) ROBUST WATERMARKING FOR DIGITAL OBJECTS

(75) Inventor: Poorvi L. Vora, Menlo Park, CA (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/163,716

(22) Filed: Sep. 30, 1998

(51) Int. Cl.$^7$ ................................................. G06K 9/00
(52) U.S. Cl. ...................................................... 382/100
(58) Field of Search ................................ 382/100, 232, 382/284; 395/135; 358/454, 448, 450, 142, 124; 380/4, 23, 25, 54; 283/6, 93, 94; 348/475; 235/494

(56) References Cited

U.S. PATENT DOCUMENTS

| | | | |
|---|---|---|---|
| 5,530,751 A | | 6/1996 | Morris |
| 5,530,759 A | * | 6/1996 | Braudaway et al. .......... 380/54 |
| 5,568,570 A | * | 10/1996 | Rabbani ...................... 382/232 |
| 5,636,292 A | * | 6/1997 | Rhoads ........................ 382/232 |
| 5,689,587 A | * | 11/1997 | Bender et al. ............... 382/232 |
| 5,721,788 A | * | 2/1998 | Powell et al. ............... 382/100 |
| 5,734,752 A | * | 3/1998 | Knox ........................... 382/212 |
| 5,768,426 A | * | 6/1998 | Rhoads ........................ 382/232 |
| 5,832,119 A | * | 11/1998 | Rhoads ........................ 382/232 |
| 5,850,481 A | * | 12/1998 | Rhoads ........................ 382/232 |
| 5,862,260 A | * | 1/1999 | Rhoads ........................ 382/232 |
| 5,915,027 A | * | 6/1999 | Cox et al. ..................... 380/54 |
| 5,930,369 A | * | 7/1999 | Cox et al. ..................... 380/54 |
| 5,946,414 A | * | 8/1999 | Cass et al. ................... 382/183 |
| 5,949,055 A | * | 9/1999 | Fleet et al. .................. 235/469 |
| 6,086,706 A | * | 7/2000 | Brassil et al. ................ 156/277 |

OTHER PUBLICATIONS

Szepanski Wolfram, "A Signal Theoretic Method for Creating Forgery–Proof Documents For Automatic Verification", 1979 Carnahan Conference On Crime CounterMeasures, pp. 101–109, May 16–18, 1979.*

Zhao et al., "Embedding Robust Labels into Images For Copyright Protection", Proc of International, Aug. 1995.*

Congress on Intellectual Property Rigths for Specialized Information, Knowledge and New Technologies, pp. 1–10.*

Bors et al., Embedding Parametric Digital Signatures in Images, Dept. of Informatics, Univ. of Thessaloaiks, pp. 1–9, Sep. 1996.*

Matsui et al., "Video–Steganography: How to Secretly Embed a Signature in a Picture", IMA Intellectual Property Project Proceedings, vol. 1, Issue 1, pp. 187–206, Jan. 1994.*

Duan et al., "Intra–Block Algorithm for Digital Watermarking" IEEE Proc. 14th Int. Conf. on Pattern Recognition, Aug. 16–20, 1998, pp. 1589–1591.*

Puate et al. Using Fractal compression scheme to embed a digital signature into an image, Proc. SPIE vol. 2915: Video Techniques & Software for full–Service Networks, pp. 1–12, Aug. 1997.*

Boland et al., "Watermarking digital images for copyright protection", Image processing and its application Conference, Jul., 4–6, 1995, pp. 326–330.*

Ogihara et al., "Data embedding into pictorial images with less distortion using discrete cosine transform", Proc. of the 13$^{th}$ Int. Conf. on Pattern Recogntion, Aug., 25–29, 1996, pp. 675–679.*

Ó Ruanaidh et al., "Watermarking digital images for copyright protection", IEE Proc.–Vis. Image Signal Process., vol. 143, No. 4, Aug. 1996, pp. 250–256.*

(List continued on next page.)

*Primary Examiner*—Jose L. Couso

(57) ABSTRACT

Method of embedding a watermark in a digital object. The watermark is used to perform argument modulation of a transform of the object. Watermark data is used in the argument of the transform to effectively shift around values in the transform domain.

20 Claims, 3 Drawing Sheets

OTHER PUBLICATIONS

Ó Ruanaidh et al., "Phase watermarking of digital images", Int. Conf. on Image Proc., vol. III, 16–19, Sep. 1996, pp. 239–242.*

Borç et al., "Image watermarking using DCT domain constraints", Proc. IEEE Int. Conf. on Image Processing, Sep. 16–19, 1996, pp. 232–234.*

Hsu et al., "Hidden signatures in images", Proc. IEEE Int. Conf. on Image Processing, Sep. 16–19, 1996, pp. 223–226.*

Borç et al., "Embessing parametric digital signatures in images", European Conf. on Signal Processing, Sep. 1996, pp. 1701–1704.*

Podichuk et al., "Perceptual watermarking of still images", Proc. IEEE $1^{st}$ Workshop on Multimedia Signal Processing, Jun. 23–25, 1997, pp. 363–368.*

Barni et al., "Robust watermarking of still images for copyright protection", Proc. $13^{th}$ Int. Conf. on Digital Signal Processing, Jul. 2–4, 1997, pp. 499–502.*

Silvestre et al., "Image watermarking using digital communication techniques", Proc. $6^{th}$ Innt. conf. oon Image Processing and it's Applications, Jul. 14–17, 1997, pp. 443–447.*

Tang et al., "A DCT–based coding of images in watermarking", Int. Conf. on Inf., Comm. and Sig. Proc., ICIC'97, Singapore, Sep. 9–12, 1997, pp. 510–512.*

Ó Ruanaidh et al. ("Rotation, scale and translation invariant digital image watermarking", Proc. IEEE Int. Conf. on Image Processing, Oct. 26–29, 1997, pp. 536–539.*

Swanson et al., "Data hiding for video–in–video", Proc. Int. Conf. on Image Processing, Oct. 26–29, 1997, pp. 676–679.*

Cox et al., "Secure spread spectrum watermarking for multimedia", IEEE Trans. on Image Processing, vol. 6, No. 12, Dec. 1997.*

A. Bors and I. Pitas, "Image Watermarking Using DCT Domain Constraints", 1996 IEEE Conference on Image Processing (ICIP'96), Lausanne, Switzerland, vol. III, pp. 231–234, Sep. 1996.

J.J.K. O Ruanaidh, W.J. Dowling and F.M. Boland, "Phase Watermarking of Digital Images" IEEE International Conference on Image Processing, vol. III, pp. 239–241, Lausanne, Switzerland, Sep. 16–19, 1996.

Gordon W. Braudaway, "Protecting Publicly–Available Images with an Invisible Watermark", IEEE International Conference on Image Processing, Santa Barbara, CA vol. I of III, Oct. 26–29, 1997, pp. 524–527.

Bo Tao & Bradley Dickinson, "Adaptive Watermarking in the DCT Domain", IEEE Conference on ASSP, Munich, Germany, vol. IV of V, Apr. 21–24, 1997, pp. 2985–2988.

E. Koch & J. Zhao, "Towards Robust and Hidden Image Copyright Labeling", Proceedings of 1995 IEEE Workshop on Nonlinear Signal and Image Processing, Jun. 20–22, 1995.

* cited by examiner

ROBUST WATERMARKING FOR DIGITAL OBJECTS

BACKGROUND OF THE INVENTION

1. Field of the Invention

The present invention deals with the process of watermarking digital objects such as still images, video, multimedia, and sound.

2. Art Background

Watermarks are methods for identification or authentication, such as watermarked paper showing a logo or design. In the digital arts, watermarking refers to processes by which the watermark, identifying or authenticating data, is embedded in a digital object, or the mark is extracted from a digital object. Watermarking is used in copyright protection as a means of identifying ownership and enabling the detection of copies and derivatives.

In the case of watermarking still images, most published methods use the watermark to manipulate the amplitude of pixel values directly in the pixel domain. For example, U.S. Pat. No. 5,530,751 to Morris embeds a digital watermark in an object by manipulating the amplitude of selected digital samples of the object. This approach is also used in U.S. Pat. No. 5,636,292 to Rhoads. "Protecting Publicly-Available Images with an Invisible Watermark" by Gordon W. Braudaway, IEEE International Conference on Image Processing, Santa Barbara, October 1997 discloses a method of multiplying the amplitude of the image by the watermark. Such systems that vary the amplitude of the image are vulnerable to additive noise, and are also vulnerable to attack. Other systems, such as "Adaptive Watermarking in the DCT Domain" by Bo Tao & Bradley Dickinson, IEEE Conference on ASSP, April 1997; "Towards Robust and Hidden Image Copyright Labeling" by E. Koch & J. Zhao, Proceedings of 1995 IEEE Workshop on Nonlinear Signal and Image Processing (Neos Marmaras, Halkidiki, Greece, Jun. 20–22, 1995), pp. 452–455; and "Image Watermarking Using DCT Domain Constraints" by A. Bors and I. Pitas, 1996 EEEE International Conference on Image Processing (ICIP'96), Lausanne, Switzerland, vol. III, pp. 231–234, Sep. 16–19, 1996, disclose techniques for embedding watermarks by enforcing constraints on the ordering or differences of transform values, typically block Discrete Cosine Transforms (DCT). While these systems are more resistant to noise, they are not resistant to other operations such as cropping and scaling as they depend on accurate registration with the original image. The method disclosed in "Phase Watermarking of Digital Images" by J. J. K. O Ruanaidh, W. J. Dowling and F. M. Boland, IEEE International Conference on Image Processing, Vol. III pp. 239–241, Lausanne, Switzerland, September 1996 hides the watermark in the phase of the DCT; the computational complexity and numerical errors involved in this approach are undesirable, and the phase is extremely susceptible to translations of the original image.

As noted, methods that include a watermark by manipulating pixel amplitudes are susceptible to noise and are vulnerable to attempts at removal. If the watermark is highly correlated, such as a company logo, it will often be visible in the watermarked image. The block DCT methods are susceptible to image translations. A watermarking scheme should result in an invisible or imperceptible mark even when the watermark itself is highly correlated, be difficult to intentionally remove, and be robust to common image transformations such as compression including lossy compression, JPEG compression, requantization, contrast enhancement, brightness variation, conversion to gray scale, blurring, and sharpening.

SUMMARY OF THE INVENTION

In a first embodiment of the present invention, watermark information is incorporated in a digital object by including the watermark in the argument of a transform of the image. By using the watermark to perform argument modulation of the object in the transform domain, rather than modifying the amplitude of the image, the resulting watermarked image is more robust and resistant to attack. A second embodiment of the present invention discloses an additional method of argument modulation. A third embodiment combines the watermarking process with lossy compression. In all embodiments the argument modulation process results in a loss of information, thus making the watermarked object less vulnerable to intentional attack.

BRIEF DESCRIPTION OF THE DRAWINGS

The present invention is described with respect to particular exemplary embodiments thereof and reference is made to the drawings in which.

DETAILED DESCRIPTION

Robust watermarking of digital objects such as images has been suggested as a means of copyright protection. For robustness the watermark should be inserted in a region of perceptual significance, so that any damage to the watermark includes damage to the perceptual quality of the digital object. For the watermark to be imperceptible, it should not be in regions of great perceptual significance. Selection of suitable regions is a process known to the art. Alternative positions of the watermark include placing the watermark at a known position within the image, such as in a particular corner or the center of the image, tiling the watermark across the image or sections of the image, or combinations of the above.

Where known methods of embedding watermarks in digital objects for the most part deal with hiding watermark information in the amplitude domain, the current invention embeds the watermark information in the argument of the transform or frequency domain of the image. While the invention is described with respect to still images, it is applicable to a range of digital objects, including but not limited to sound, video, and multimedia.

The watermark itself for images is a two-dimensional distribution of intensities. It may be color, gray-scale, or binary with increasing robustness. Binary watermarks are used in the preferred embodiment, the watermark being an array of ones and zeroes. The watermark may be an unencrypted, unencoded company logo, or an encrypted message including error correction. These attributes of the watermark depend on the degree of robustness required, the nature and amount of the information to be hidden, and the computational complexity to be tolerated in the detection process.

Figure 1:
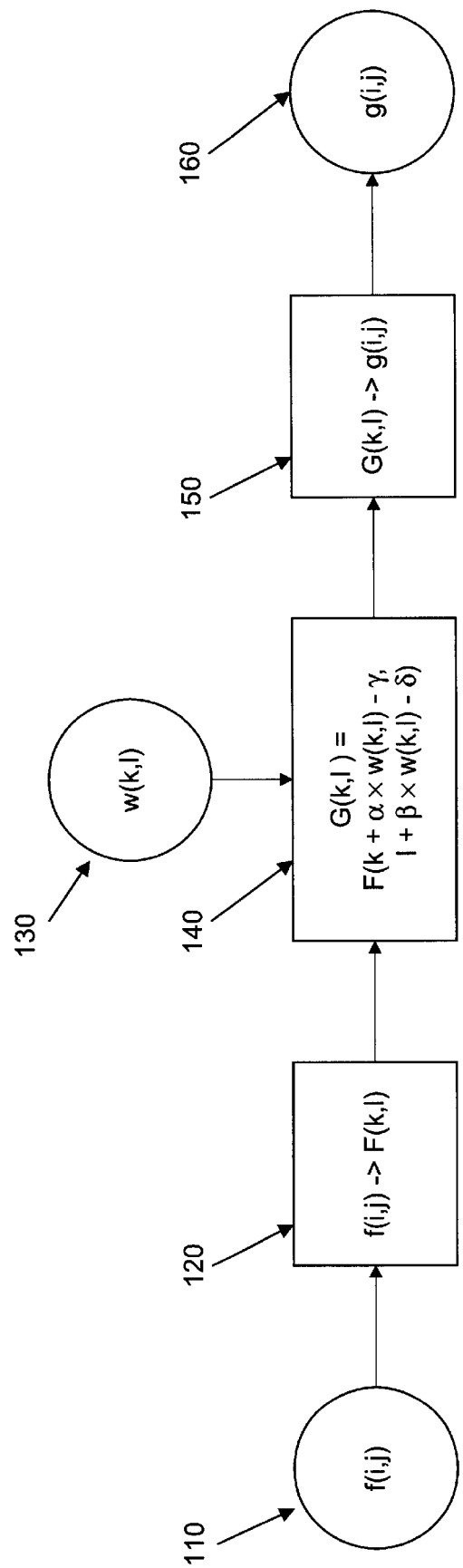
FIG. 1 shows a block diagram of apparatus for watermarking digital objects.

Referring to FIG. 1 for a first embodiment of the current invention, let f(i,j) 110 represent the original image. In step

120 F(k,l) is computed, representing the transform of image f(i,j). Transform F could be the Discrete Fourier Transform (DFT), Discrete Cosine Transform (DCT), or other known transforms such as Walsh, Hadamard, Discrete Hartley, or Discrete Wavelet transforms. Let w(k,l) 130 be the watermark to be applied. Let g(i,j) 160 be the watermarked image, and G(k,l) formed in step 140 the transform of the watermarked image. The relationships between the images and their transforms are:

$$f(i,j) \leftrightarrow F(k,l)$$

$$g(i,j) \leftrightarrow G(k,l)$$

Using methods known to the art, a range of parameter values in the transform domain are chosen that retain sufficient perceptual information so that destroying the watermark will destroy image quality, while not being perceptually dominant. For these values $\alpha$, $\beta$, $\gamma$, and $\delta$ the transform of the watermarked image is:

$$G(k,l) = F(k + \alpha \times w(k,l) - \gamma, l + \beta \times w(k,l) - \delta)$$

where $\alpha$, $\beta$, $\gamma$, and $\delta$ provide an affine conversion between the values of w(k,l) and the values of the chosen argument shift. Note that the watermark data is being applied to the transform of the image, shifting image elements from one place in the transform domain to another. The original image f(i,j) 110 is transformed 120 to F(k,l) and watermark w(k,l) 130 used to modulate 140 F(k,l), the transform, creating the transform of the watermarked image, G(k,l). The inverse transform 150 is applied to G(k,l) producing the watermarked image g(i,j) 160.

Figure 2:
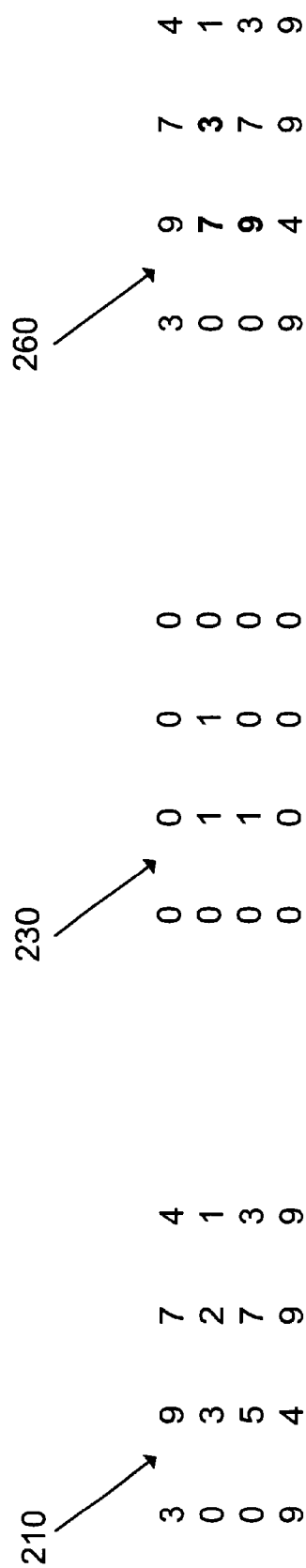
FIG. 2 shows an example of argument shifting according to the present invention.

This argument modulation process is also shown in FIG. 2. In this figure, matrix 210 is the transform of the image, F(k,l). Matrix 230 is the watermark w(k,l), and matrix 260 is the watermarked transform G(k,l). Using standard matrix notation, F(1,1)=3, F(1,2)=9, F(1,3)=7 and so on. Using the values $\alpha = \beta = 1$ and $\gamma = \delta = 0$, the process of applying the watermark shown above simplifies to:

$$G(k,l) = F(k + w(k,l), l + w(k,l))$$

and has the effect of shifting elements in the F(k,l) matrix 210 wherever the watermark matrix w(k,l) 230 contains a 1. For example, w(1,1) contains 0, so G(1,1) =F(1,1)=3. But w(2,2)=1, so G(2,2)=F(2+w(2,2), 2+w(2,2))=F(3,3)=7. Likewise G(2,3)=F(2+w(2,3), 3+w(2,3))=F(3,4)=3. The shifted values in matrix G(k,l) 260 are shown in bold. With the values given, watermark elements equal to 1 have the effect of shifting values in the transform up and to the left.

This process of argument modulation is computationally very efficient, and may be implemented in software or hardware. Since it is not a linear, additive process, shifting elements in the transform domain rather than adding a value to elements in either the image or transform domain, it is not susceptible to attacks common to to linear and additive systems, nor does the resulting watermark deteriorate under common operations such as compression, requantizing, enhancement, blurring, and sharpening.

A distinct watermark may be used for each of the k,l directions, reducing redundancy and robustness, but increasing information content. Given a second watermark z(k,l) the process of watermarking becomes:

$$G(k,l) = F(k + \alpha \times w(k,l) - \gamma, l + \beta \times z(k,l) - \delta)$$

For watermarking color images, the watermark may be inserted in one or more of the elements of the color space for the image. For example, if an image is processed in an RGB color space, separating it into red, green, and blue elements, the watermark is applied to one or more of these elements. Similarly, if the color image is processed in a luminance—chrominance space, the watermark is applied to one or both of the chrominance or luminance elements. While in these cases it is possible to apply the watermark to one or more of the possible elements, or to apply different watermarks to each element, thereby increasing information content, this reduces redundancy and robustness as noted previously, and may in some circumstances produce more perceptible differences in the resulting watermarked image. For each chosen element, the transform is applied and the watermark applied in the transform domain as previously described. The inverse transform is applied producing the watermarked element.

A second embodiment of the present invention uses an additional key to select the direction of shift performed during the process of argument modulation. In this embodiment of the invention the watermark is added into the transform domain of the image according to:

$$G(k,l) = F(k + \lambda_k, l + \lambda_l)$$

where $$\lambda_k = +/- (\alpha \times w(k,l) + \gamma)$$

$$\lambda_l = +/- (\alpha \times w(k,l) + \gamma)$$

depending in some manner on F(k,l), for example choosing +if the $i^{th}$ bit of F(k,l) is a 1, and choosing—if the $i^{th}$ bit of F(k,l) is a zero.

A third embodiment of the invention applies to watermarking digital objects during compression. Lossy compression schemes for digital images such as JPEG or MPEG, and digital sound typically perform the following steps:

(1) Transform the object
(2) Quantize the transform coefficients
(3) Encode the quantized transform coefficients.

In image compression, the block Discrete Cosine Transform (DCT) is commonly used. After the DCT is performed, the resulting coefficients are quantized as is known in the art. This quantization step introduces loss, and allows the encoding process, usually using run length codes, Huffman codes, or other compression technology, to greatly reduce the amount of storage required for the image.

In sound compression, a similar process is used, with a transform being applied to the digitized sound stream, quantization applied to the transform coefficients, and the results encoded. The quantization may be a simple process, or may be a complex process relying on an analysis of the human auditory system, such as the ATRAC process used in mini-discs.

For digital objects subject to lossy compression, watermarking according to the present invention may be applied as part of the overall compression process. The transform is applied to the object, and the watermark may be applied either before or after the quantization step. After the watermark is applied the encoding process is applied. As in other embodiments of the present invention, this may be accomplished using software controlling a standard processor, software controlling a specialized processor such as a digital signal processor (DSP), or by custom hardware.

Figure 3:
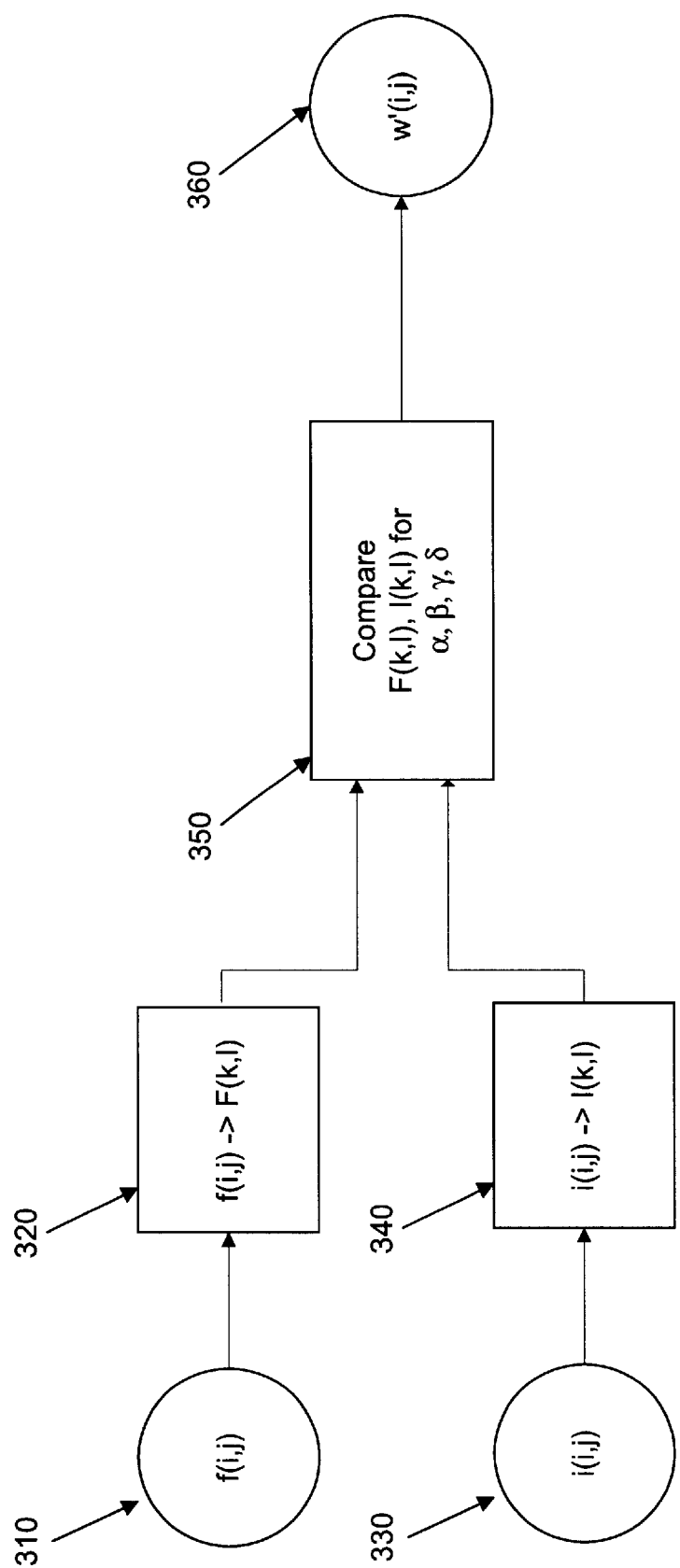
FIG. 3 shows a block diagram of an apparatus for detecting watermarked objects.

Watermark detection is performed as shown in FIG. 3 using the original digital image f(i,j) 310 and candidate image i(ij) 330. The transform F(k,l) of the original image is computed 320, as is the transform I(k,l) of the candidate image, 340. The transformed candidate image I(k,l) over the likely range of arguments α, β, γ, and δ as described above in the encoding process are compared 350 to the values F(k,l) of the transform of the original image for possible values of the watermark w'(k,l) 360. The value of w'(k,l) that provides the least error is chosen.

In making this comparison between the transformed candidate image and the transformed original image for a particular set of parameters α, β, γ, and δ, a simple test may note any differences between the two transforms. A more robust comparison may verify differences against the values that should have been generated by the watermarking process.

For gray scale images, this process may be calculated separately for each element in which the watermark is inserted. Watermark redundancy may be used to improve detection. For example, if the watermark is inserted in multiple elements of a color image, the watermarks detected in each element may be added together and the resulting image subjected to a detection threshold, or the detected watermarks may be averaged and subjected to a detection threshold, or the detected watermarks may be combined logically, either logically anding them together to reduce the effects of noise, or logically oring them together to give a more robust result. Redundancy in multiple elements can also be used in a far more stringent form by examining all possibly watermarked elements together and finding a best fit for all elements simultaneously. Correlation techniques may also be used, as are understood in the art. Error control coding (ECC) techniques may be used during watermark generation and insertion to introduce redundancy for increased robustness. Redundancy may be improved by incorporating multiple copies of the watermark.

The foregoing detailed description of the present invention is provided for the purpose of illustration and is not intended to be exhaustive or to limit the invention to the precise embodiments disclosed. Accordingly the scope of the present invention is defined by the appended claims.

What is claimed is:

1. A method comprising the steps of:
   a) applying a transform to a digital object to generate a transformed digital object comprising a plurality of elements indexed by a first set of arguments;
   b) modulating the first set of arguments to selectively replace elements at selected locations within the transformed digital object with other elements from other locations within the transformed digital object to generate a watermarked transformed digital object; and
   c) performing an inverse transform of the watermarked transformed digital object to generate a watermarked digital object.

2. The method of claim 1 wherein the digital object is one of a still image, a digital audio stream, or a stream of digital images.

3. The method of claim 1 wherein the digital object includes an image processed in a selected color space having a plurality of elements, wherein the watermark is incorporated into at least one element of the color space.

4. A method comprising the steps of:
   a) transforming a digital object from a first domain $f(i_1, \ldots i_n)$ to a second domain $F(k_1, \ldots k_n)$; and
   b) modulating each argument of the transformed digital object to form a watermarked transformed digital object of the form $G(k_i, \ldots k_n)$ wherein $G(k_1, \ldots k_n) = F(k_1+\lambda_1, \ldots k_n+\lambda_n)$, wherein $\lambda_i = \alpha_i \times w_i(k_1, \ldots k_n) - \gamma$, wherein $w_i(k_1, \ldots k_n)$ corresponds to the watermark for each argument, $k_i$.

5. The method of claim 4 further comprising the step of:
   c) performing an inverse transform to generate the digital information incorporating the watermark in the first domain.

6. The method of claim 4 wherein $w_i(k_1, \ldots k_n) = w(k_1, \ldots k_n)$ for $1 \leq i \leq n$.

7. The method of claim 4 wherein n=2.

8. The method of claim 4 wherein $\alpha_i = \alpha$ for $1 \leq i \leq n$.

9. The method of claim 8 wherein α is constant.

10. The method of claim 8 wherein α is a function of $F(k_1, \ldots k_n)$.

11. The method of claim 8 wherein $\gamma_i = \gamma$ for $1 \leq i \leq n$.

12. The method of claim 11 wherein γ is constant.

13. The method of claim 11 wherein γ is a function of $F(k_1, \ldots k_n)$.

14. The method of claim 4 wherein the transform is one of a Fourier, discrete Fourier (DFT), discrete cosine (DCT), discrete sine (DST), Walsh, Hadamard, Hartley, or Wavelet transform.

15. A computer storage medium having instructions stored therein for programming a computer to perform the method of claim 4.

16. The method of claim 4 further comprising the steps of:
   c) quantizing the watermarked transformed digital object; and
   d) compressing the quantized result.

17. A method of extracting a watermark embedded in a candidate digital object, comprising the steps of:
   a) applying a transform to each of an original digital object and the candidate digital object;
   b) modulating arguments of a selected one of the transformed original and candidate digital objects in accordance with modulation parameters; and
   c) identifying a resulting set of modulation parameters resulting in a minimum difference between the modulated transformed digital object and the other transformed digital object, wherein the resulting set of modulation parameters identify the watermark.

18. The method of claim 17 wherein the modulation parameters are of the form $\alpha \times w(k_1, \ldots k_n) + \gamma$ for each transform argument $k_i$, wherein $w(k_1, \ldots k_n)$ corresponds to the watermark.

19. A computer storage medium having instructions stored therein for programming a computer to perform the method of claim 17.

20. The method of claim 17 wherein the digital object is one of a still image, a digital audio stream, or a stream of digital images.

* * * * *